May 27, 1941.  W. I. HUTCHISON  2,243,209

STATISTICAL CHART

Filed June 21, 1939  2 Sheets-Sheet 1

INVENTOR
Wallace I. Hutchison.
BY Harness, Dickey & Pierce.
ATTORNEYS.

May 27, 1941.　　W. I. HUTCHISON　　2,243,209
STATISTICAL CHART
Filed June 21, 1939　　2 Sheets-Sheet 2
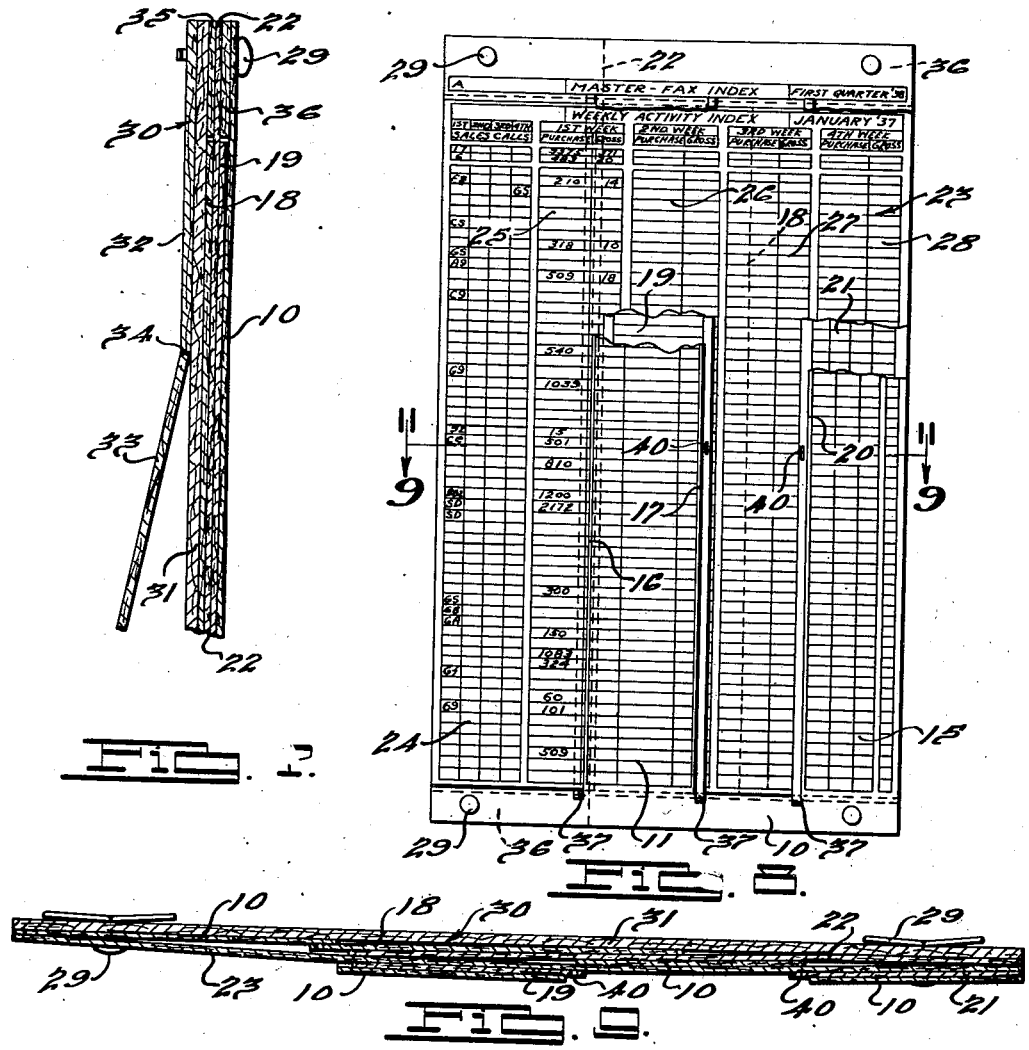
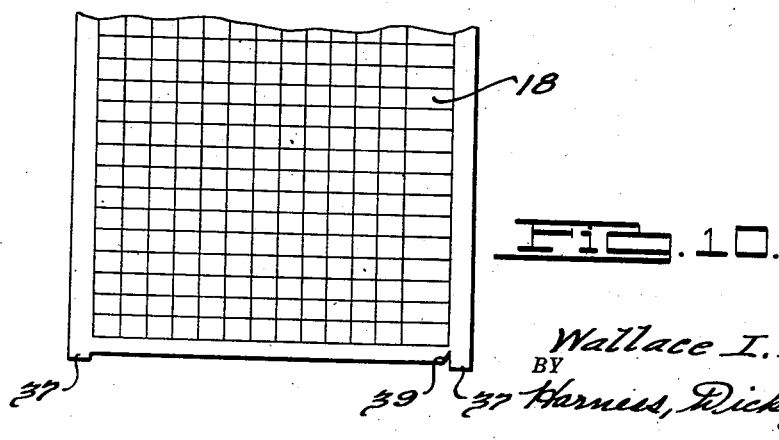
INVENTOR
Wallace I. Hutchison.
BY Harness, Dickey & Pierce.
ATTORNEYS.

Patented May 27, 1941

2,243,209

UNITED STATES PATENT OFFICE 2,243,209

STATISTICAL CHART

Wallace I. Hutchison, Detroit, Mich.

Application June 21, 1939, Serial No. 280,249

5 Claims. (Cl. 35—24)

This invention relates to statistical charts, and more particularly to a chart of the type described which is adapted to serve as a sales index and control sheet.

In organizations of any size it is highly desirable to install a control system in the sales department which will enables the sales manager to readily ascertain the weaknesses of his company's business and the probable causes thereof as well as the best method of overcoming the same. Such systems of necessity involve the employment of a special bookkeeper, whose duties include the integration of information obtained from the auditing department and the individual salesmen, and the recording thereof in as convenient a manner as possible for future consideration. At best, however, this method of control is a tedious one for the sales manager or other overseer, and in actual practice has its decided limitations due to inevitable inaccuracies on the part of the bookkeeper. Thus, the recording of the information in the form desired requires almost super-human care and effort due to the extensiveness of the sheet or sheets upon which the information is recorded and the large number of auxiliary books and files required.

It is accordingly, an important object of the present invention to provide a statistical or sales control chart which can not only be prepared or filled in with ease and rapidity, but examined in any stage of its preparation for the purpose of readily determining the general condition of the business as well as the individual factors which appear to be adverse or subject to correction or improvement.

A further object of the invention is to provide a chart of the type described which covers a definite and limited period of time, yet is adapted to provide a perpetually continuing control system or index in combination with charts covering similar periods either preceding or following said period.

Still further objects and advantages of the invention will appear from the following description and appended claims when considered in connection with the accompanying drawings, in which:

Figure 1 is a plan view of one embodiment of the chart constituting the present invention, showing slide cards inserted within pockets opening on the surface thereof;

Fig. 2 is a plan view of the chart showing the slide cards partially removed from their pockets, the face of the chart being broken away in part to reveal the indicia on portions of said cards;

Fig. 3 is a transverse section taken on the line 3—3 of Fig. 1, looking in the direction of the arrows;

Fig. 4 is a transverse section taken on the line 4—4 of Fig. 2, looking in the direction of the arrows;

Fig. 5 is a sectional view taken on the line 5—5 of Fig. 2, looking in the direction of the arrows;

Fig. 6 is a sectional view similar to Fig. 5 but showing only one of the slide cards, which card is in its outermost position;

Fig. 7 is a sectional view taken on the line 7—7 of Fig. 1, looking in the direction of the arrows;

Fig. 8 is a plan view of a chart having a weekly activity index sheet as well as a slightly modified form of slide card inserted in its several pockets, the face of the chart and the slide cards being broken away in part to reveal the markings on the entire upper portion of said sheet;

Fig. 9 is a transverse sectional view taken on the line 9—9 of Fig. 8, looking in the direction of the arrows;

Fig. 10 is a plan view of one end of a slightly modified form of slide card.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation and it is not intended to limit the invention claimed herein beyond the requirements of the prior art.

The preferred form of chart suitable for the purposes of the invention is shown most clearly in Figs. 1 through 7, Figs. 8 and 9 showing in addition the weekly activity index sheet which may or may not be used in operative combination with the chart, as desired. In all the figures the numeral 10 represents the main sheet or body of the chart which has on its upper surface when completely filled out information representing the relative activity of the company's business over a period of three months or one-quarter of the year. Sheet 10 is preferably divided into five main vertical columns including a central column 11 containing an alphabetical list of customers or accounts, either actual or prospective, together with the city in which each customer is located and code information regarding the status of the account.

To the left of the central column 11 are two columns 12 and 13 headed "Current past due" and "Current sales calls," respectively, each of which are further divided into three vertical columns representing consecutive months. Column 12 contains data as to the amount, if any, then past due, while column 13 contains code information regarding the probable standing of the company's products and the individual salesman with the customers as determined by the sales call made during the period represented. To the right of the central column 11 are two other columns 14 and 15 headed "Current purchases" and "Current gross," respectively, which are divided in the same manner as columns 12 and 13 into vertical columns representing the months of that quarter. Column 14 contains figures denoting the total number of items, if any, of the company's product or products purchased by each customer during each month, while column 15 contains the amounts representing the gross profits, if any, obtained from each customer during each month. The information contained in columns 12, 14 and 15 is obtained from the auditing department or some equivalent department for handling the funds and keeping the accounts of the organization. The information in column 13, however, is obtained either directly or indirectly from the salesman and has been found to be a very valuable portion of the chart from the standpoint of quickly determining the causes of the weak spots in the company's business and assisting generally in the interpretation of the other facts on the chart.

To the right of the columns under the heading "Current gross" (column 15) are two additional columns headed "Lab-R" and "Assists." In these columns are recorded the number of laboratory reports which have been made as well as the number of assist calls involving the presence of a chemist or other technician. Such information is desirable as it helps the sales manager to know what customers are requiring special sales efforts at any particular time, and also tends indirectly to show to what extent the company's products are able to sell themselves.

For the further assistance of the bookkeeper in the preparation of the chart and the sales manager in studying the same, additional columns of information are provided on separate cards normally positioned substantially out of sight beneath the main sheet 10 of the chart but movable to an exposed position adjacent the central column 11 containing the list of customers. In the arrangement as shown for example, longitudinal slits 16 and 17 are provided in the face of the chart 10 on either side of column 11 and extending substantially the entire length of the chart. These slits serve as pocket openings for receiving the cards 18 and 19 which are slidable inwardly beneath column 11 toward the right and left respectively. The exposable surface of card 18 is headed "Next call planned" and is sub-divided into three monthly columns which are each in turn sub-divided into four weekly columns. In using card 18 the bookkeeper puts a check mark under the week of the next call planned by the salesman with each customer, thus having a record of the total number of the calls made or planned during that quarter. Card 19, on the other hand, is headed "Salesmen's weekly memo," and contains information to be given each week by the bookkeeper to the salesman to assist the latter in the conduct of his calls. A new memo card is used each week, thus requiring twelve separate cards for each separate chart, each of which may be discarded as soon as it is replaced by another card and the salesman has been duly advised of the information thereon.

Another longitudinal slit 20, similar to slits 16 and 17, is provided in the face of chart 10 between columns 14 and 15 to form a pocket opening for a third slidable card 21, which has summary information thereon of greatest value to the sales manager. Card 21 as shown in the drawings (see Fig. 2) is provided with five vertical columns of figures or letters headed from left to right as follows: "Average purchases," "Average gross," "Lab-R," "Assists" and "Salesman's calls." The first two columns refer to the average number of items purchased and the average gross profit received from each customer per month, while the last three columns refer to the total number of laboratory reports, assist calls and salesman's calls made to date, i. e. from the beginning of the company's records through the end of that quarter. Information such as this clearly permits the sales manager to see at a glance the relative activity of each account and the relation of this activity to the efforts of the salesman and to the use of supplemental methods of education or inducement.

As the cards 18 and 19 are slidable in opposite directions under the account column 11, it is essential to provide a stationary or fixed dividing element such as the sheet or card 22 beneath each sheet 10 and extending substantially from slit or opening 16 to the righthand edge of the chart. Such an arrangement permits easy insertion of cards 18 and 19 which would otherwise be practically impossible due to inevitable contact between the cards as they are inserted.

The chart as described above is substantially complete, and may be used with great ease both by the bookkeeper in supplying data from time to time and the sales manager in studying the same. The use of the chart may be still further facilitated, however, by employing in connection therewith a weekly activity index sheet 23 upon which weekly information regarding sales calls, purchases, and gross profits is recorded (see Fig. 8). To accomplish this sheet 23 is divided into five main vertical columns 24, 25, 26, 27 and 28 respectively, column 24 being headed "Sales calls" and being sub-divided into four columns for each week of the month, while columns 25, 26, 27 and 28 are headed "First week," "Second week," "Third week" and "Fourth week" respectively, and are each sub-divided into two sub-columns headed "Purchases" and "Gross" respectively.

Sheet 23 is substantially the same width as sheet 10 and of substantially the same length as the slide cards 18, 19 and 21, and may, therefore, be readily inserted into slits 16, 17 and 20 in a manner to permit sliding it back and forth for marking and inspection. It is most easily associated with the chart by first inserting it leftwardly into slit 17 and out through slit 16, and then moving it farther leftward until its righthand edge is to the left of slit 20. The sheet is then inserted in slit 20 and shifted to the right until its righthand edge is substantially flush with the righthand edge of the main sheet 10 of the chart. It is then in a position suitable for filing away with the chart (see Fig. 9), and may be readily shifted to the right or left during use to bring the column or columns upon which entries are to be made or containing entries to be studied in close easy reading proximity to the central column 11 on the sheet 10. Upon inserting sheet 23 in the various slits of the sheet 10 in the manner described, care should be taken to make the insertions underneath cards 19 and 21, if these cards are already in place, as this permits ready inspection of the slide cards as well as the index sheet. The sheet will of necessity be on top of dividing sheet 22 and slide card 18, when inserted in the manner stated. Nevertheless, card 18 can be readily reached by shifting sheet 23 sufficiently far to the right, i. e. by moving its lefthand edge to a point substantially under the account column 11, where it is temporarily out of the way. When a month has gone by and sheet 23 is completely filled, the information thereon is totalled up or condensed, and then incorporated in the appropriate monthly column on the main sheet 10, after which a new weekly index sheet is substituted therefor.

Main sheet 10 may be fastened by any suitable means, such as ordinary paper fasteners or clasp pins 29, to the back board 30, which preferably consists of two layers 31 and 32, the latter of which has a free end 33 and is provided medially of its ends with a transverse line of weakness, such as the line of perforations 34, which permits the free end 33 to be moved outwardly away from layer 31 to provide a member for supporting the chart in an upright position. Spacer strips 35 and 36 are also provided along the upper and lower edges of back board 30, and serve to space the divider sheet 22 from the back board and sheet 10 from sheet 22 and the back board. Sufficient space is thereby allowed for the easy passage of the various slide cards. As the inner edges of strips 35 and 36 lie substantially flush with the ends of slits 16, 17 and 20, they also serve as guides for the slide cards as they are shifted transversely back and forth.

Each of the slide cards 18, 19 and 21 is preferably provided with means adjacents the corners on one side to prevent the complete insertion of the card into its slit or pocket, and also with means adjacent the corners on the other side to prevent complete withdrawal. In the slide cards shown in Figs. 1 to 6, the means for preventing complete insertion consists of longitudinally extending tabs 37 at the appropriate upper and lower corner, while the means for preventing complete withdrawal consists of a short strip 38 of cardboard or the like which is pasted or otherwise fastened to the opposite upper and lower corner of each card. As the tabs 37 extend beyond the ends of the various slits, it is readily seen that they tend to prevent complete disappearance of the card beneath sheet 10. In a like manner, strips 38 tend to prevent complete withdrawal of the card, since they contact the edges of the slits when the cards are just short of being entirely removed. The strips 38 are not essential, however, and may be omitted, as shown in the modified form of card in Fig. 8, particularly when the cards are made sufficiently wide to prevent accidental withdrawal thereof during normal use.

In the variation shown in Fig. 10, the cards are provided on all four corners with tabs 37. In such case, it is desirable to form a notch 39 adjacent at least one of the tabs employed to prevent withdrawal, as this permits an endwise movement of the cards which enables the card to be readily removed or replaced, when it is actually desired to do so. It is also helpful in many instances to provide small slots or openings 40 centrally of the exposed edge of each slide card (see Fig. 8), as this facilitates grasping the card with the thumb nail to move it outwardly from its pocket.

The method of operating or using the chart is believed to be clear from the above description. The chart is filled out continuously by the bookkeeper. Thus the salesman's weekly memo on slide card 19 and the activity index sheet 23 are filled out each week. A new slide card 19 is used each week, and when a month has gone by the information on the activity index sheet is summed up and entered under the appropriate monthly columns on main sheet 10, after which a new index sheet is inserted in the chart. As the slide card 18 has sufficient weekly columns for the entire quarter, it is unnecessary to replace the same each week or month. This card not only shows instantly when the next call is planned for each customer, but may be used at the end of the quarter to quickly ascertain the relative activity of the salesman during that period. Slide card 21 is filled out only at the completion of the quarter and is used primarily to provide a convenient summary of the trend of the company's business and the relation of customer activity to the activity of the sales and technical departments.

The present apparatus permits a practical sales study and control system to be put into operation. A system such as described is usually so complicated and requires such extensive charts, as well as such a large number of supplemental books and cards, that it is almost impossible for a bookkeeper to record the desired information without consuming a large amount of time and making an undue number of mistakes. Further, if such information is successfully and accurately recorded by any of the methods known up to the present time, it is practically out of the question for the sales manager to digest the material without extensive study and loss of time. The charts described herein, however, render it possible to quickly ascertain the information desired, such as the trends or weak spots in the business, and also minimize the possibility of confusion or error in the interpretation of the facts supplied.

What is claimed is:

1. A statistical chart comprising a main sheet having statistical data thereon including a centrally located column, said main sheet being provided with a longitudinal slit on each side of said column, a pair of slide cards having appropriately designated space for statistical data thereon, said slide cards being of such size and shape as to be transversely slidable in opposite directions through said slits into and out of a position substantially in back of said sheet, and a dividing sheet situated in back of said main sheet serving to separate said slide cards from each other.

2. A statistical chart comprising a main sheet having statistical data thereon including a centrally located column and at least one other column, said main sheet being provided with a slit along both edges of said centrally located column and along one edge of said second named column, and a plurality of slide cards having appropriately designated space for statistical data thereon, said slide cards being of such size and shape as to be slidable through said slits into a position substantially in back of said columns, at least two of said slide cards being slidable in opposite directions into a position in back of the same column, and means for separating said last named slide cards from each other.

3. A statistical chart comprising a main sheet having statistical data thereon, said main sheet being provided with a plurality of longitudinal slits, a plurality of slide cards having appropriately designated space for statistical data thereon, each of said slide cards being of less width than said main sheet and being of such size and shape as to be slidable through one of said slits into and out of a position substantially beneath said sheet, and a slide card of substantially the same width as said sheet and slidable through said slits to cover and expose alternate portions thereof.

4. A statistical chart comprising a main sheet having statistical data thereon, said main sheet being provided with a plurality of longitudinal slits, a plurality of slide cards of less width than said main sheet having appropriately designated space for statistical data thereon, each of said slide cards being of such size and shape as to be slidable through one of said slits into and out of a position substantially in back of said sheet, and another slide card of substantially the same width as said main sheet, said last named card being slidable through said slits into and out of a position in back of spaced portions of said main sheet and at least two of said first mentioned slide cards.

5. A statistical chart comprising a main sheet having statistical data thereon, said main sheet being provided with a plurality of slits of less length than the length of said sheet, a plurality of slide cards slidable through said slits into and out of a position substantially in back of said sheets, tabs on said cards extending transversely to the direction of sliding movement and tending to prevent said cards from being completely inserted beneath said sheet, other similarly extending tabs on said cards tending to prevent said cards from being completely withdrawn from said sheet during normal use of said cards, and a notch on each card adjacent said last mentioned tabs to permit an endwise movement of said cards whereby they may be removed from said chart.

WALLACE I. HUTCHISON.